United States Patent [19]

Pham et al.

[11] Patent Number: 4,841,574
[45] Date of Patent: Jun. 20, 1989

[54] VOICE BUFFER MANAGEMENT

[75] Inventors: Xuan N. Pham; John H. Wilson, both of Austin, Tex.

[73] Assignee: International Business Machines Corporation, Armonk, N.Y.

[21] Appl. No.: 786,914

[22] Filed: Oct. 11, 1985

[51] Int. Cl.$^4$ .............................................. G01L 3/00
[52] U.S. Cl. ...................................... 381/31; 381/36; 381/41; 364/513.5; 379/87; 379/88
[58] Field of Search ................ 381/31, 32, 36, 41–43; 370/58, 60, 88; 379/87, 88, 89; 364/513.5, 513, 518; 382/13

[56] References Cited

U.S. PATENT DOCUMENTS

| | | | |
|---|---|---|---|
| 3,166,715 | 1/1965 | Cogar | 328/37 |
| 3,676,846 | 7/1972 | Busch | 340/146.1 |
| 3,727,204 | 4/1973 | de Koe | 340/172.5 |
| 4,003,027 | 1/1977 | DiMatteo | 340/172.5 |
| 4,121,058 | 10/1978 | Jusko et al. | 381/32 |
| 4,193,123 | 3/1980 | Meinke | 364/900 |
| 4,292,470 | 9/1981 | An | 364/513.5 |
| 4,412,098 | 10/1983 | An | 381/43 |
| 4,523,055 | 6/1985 | Hohl et al. | 379/89 |
| 4,549,047 | 10/1985 | Brian et al. | 379/88 |
| 4,646,346 | 2/1987 | Emerson et al. | 379/89 X |
| 4,663,777 | 5/1987 | Szeto | 379/88 |

FOREIGN PATENT DOCUMENTS

| | | |
|---|---|---|
| 0025684 | 3/1981 | European Pat. Off. . |
| 0054590 | 6/1982 | European Pat. Off. . |
| 0118771 | 9/1984 | European Pat. Off. . |
| 8400835 | 3/1984 | World Int. Prop. O. . |

OTHER PUBLICATIONS

IBM TDB, vol. 20, No. 8, Jan. 1978, p. 3309–3310, "Data Management in a Circular Buffer", to T. A. Chapman et al.

Primary Examiner—Patrick R. Salce
Assistant Examiner—Emanuel Todd Voeltz
Attorney, Agent, or Firm—Joseph F. Villella, Jr.; H. St. Julian

[57] ABSTRACT

In a signal processing environment, voice messages are stored into and read out of a buffer in real time. Since voice messages are being stored and read from the buffer, different sizes and rates of information are being stored therein. Small packets of digitized voice are input to the buffer at a very high rate, while larger packets of data are output from the buffer at a lower rate and can be stored into permanent memory. The buffering of this digitized voice data occurs in real time using a ringed buffer. The transfer of data into and out of the buffer is under the control of a software application running on a host processing system. The producer of the digitized voice data is a signal processing system which converts an input analog voice signal into a compressed digitized signal. The consumer of the buffered digitized voice data is a software application program which removes blocks of multiple data records from the buffer for program execution.

7 Claims, 6 Drawing Sheets

VOICE BUFFER MANAGEMENT

TECHNICAL FIELD

This invention relates to a system for providing voice buffer management, and more particularly, to a system for buffering voice messages in real time wherein the producer and consumer of the buffered voice messages manipulate voice messages of different record sizes.

BACKGROUND ART

In today's information processing environment, it is becoming increasingly popular to provide voice input and output. The capability to input voice to an information processing system expands the utility of such processing systems. For example, it enables a user to remotely input data using a telephone by merely speaking into the telephone. Elaborate coding schemes using the telephone's keypad are eliminated. Additionally, the amount of data that can be input to the system is greatly expanded since it is not limited to the amount of data that can be coded in with the keypad. A further advantage of voice input is that a user who has little facility with a keyboard can enter data into the system quite easily and without spending an inordinate amount of time learning how to keypunch data.

One approach to providing voice capability to the an information processing system is to use a signal processor along with a host processor to control both the input and output of data and the processing of data within the system. Analog audio information is input, coverted to digital, gain controlled, and compressed all under the control of a signal processor. A problem that arises is how to buffer the digitized voice messages that are being input to the system. Such a problem arises in a system in which the signal processor has a relatively small amount of buffer memory and needs to transfer small blocks of data quite frequently to the host system, while the host system has a large amount of memory available and needs to transfer large blocks of data to storage media less frequently in order to match the performance characteristics of the media. Means must be provided for buffering the voice information from the input to the disk file. This buffering must be done on a real time basis so that application programs executing on the system can store the buffered voice data on disk, as the user is speaking, so as to allow continuous speech without limiting the amount of voice data that can be input to the system. A buffer that is limited to accepting an entire voice message at a time provides an artificial approach to inputting voice data to the system. To be useful, the voice buffering approach should be able to accept the voice data as it is entered without limiting it to predetermined length.

In order to provide this real time buffering capability to a disk storage medium, the buffering mechanism must be flexible enough to allow the application to configure the size of the blocks to be transferred to disk. Further, the buffering mechanism must be able to provide continuous feedback to the application as to whether the previous transfers are keeping up with the real time production of speech data.

U.S. Pat. No. 4,193,123 discloses a first-in, first-out buffer for use with digital words representing speech segments. The digital words are input to the buffer at a first rate and read from the buffer at a second slower rate and then applied to a D/A convertor. No bit representing speech is read from the buffer until a predetermined period of time after a first bit has been written into the buffer. Fault signals are generated when the buffer becomes empty and when the buffer becomes full. The concept of buffering voice data in real time is not disclosed.

An asynchronous buffering device is disclosed in U.S. Pat. No. 3,727,204 wherein the buffer includes an information shift register and a bookkeeping register. This buffering approach adapts the shift rates of information in the shift register and the bookkeeping register to each other, i.e., the approach forces the two registers into a timing relationship. It does not enable the two to run at their own rates and to adapt to the flow of data into the buffer.

U.S. Pat. No. 3,166,715 describes an asynchronous shift register which operates at a variety of recording densities and at a variety of speeds of the recording media. The concept of a consumer and producer of buffered data operating at different rates is not disclosed.

Thus, there is a need for a voice buffer management system to handle the situation where resources which manipulate the buffer run at different speeds and have different record size requirements. This need arises because in a signal processing environment, voice messages are typically produced and consumed at unpredictable times and stored on a variety of storage media. As a result, the contention and queuing for buffer spaces become difficult to manage.

DISCLOSURE OF THE INVENTION

Accordingly, it is an object of this invention to provide an improved buffering technique.

It is another object of this invention to provide a system for buffering voice messages in real time.

It is a further object of this invention to provide buffer management in a signal processing system where the producer and consumer of buffered data operate at different rates and with different record sizes.

In accordance with these and other objects of the invention, a voice buffer management system is provided wherein fixed length records containing digitized voice signals are periodically input to a buffer at a high rate and blocks of digitized voice comprising multiples of an input record are removed at a much lower rate. The producer of the digitized voice data is a signal processing system which converts an input analog audio signal into a compressed digitized signal. The consumer of the buffered digitized voice data is an application program which removes blocks of multiple data records from the buffer for transfer to some other media. In the preferred embodiment disclosed herein, the buffer is a ring-type buffer composed of N records with M records forming a block of the buffer. Consequently, the buffer has N/M blocks. There are two pointers used to control the operation of the buffer; a producer pointer points to the next record in the block that will be written, while the consumer pointer points to the next block in the buffer that will be read.

The signal processing system provides a number of functions to control the recording and storage of the voice data. When the voice recording is initiated, the signal processing system begins to fill the buffer from the beginning with speech data records. The buffer will continue to be filled until the end of the buffer is reached, at which point it will start from the beginning again provided that the block at the beginning of the buffer is available. During this cyclic process of filling the speech buffer, the software application uses one of the functions provided to obtain the address of the oldest complete block of speech records that has not yet been processed. The software application then uses this address to write the block of speech data wherever it wishes to store the recording. This function, also serves two other purposes: first, it provides an indication to the signal processing system that the previous block is now free to hold more speech data records; and, second, it returns the number of blocks that are full. This number can be used by the application as an indication of whether it is keeping up with the real time data rate. An interrupt is also provided to the application whenever there is no space in the buffer to store the next record from the signal processing system. This record, and all subsequent records, will be discarded until the application has moved old data out of the buffer. These discarded records may cause discontinuities in the speech on playback.

The buffering approach disclosed herein is also used in the reverse direction (audio playback). In this reverse mode, the buffer is filled under control of the application with stored speech data records. When playback is initiated, the signal processing system begins to use records from the beginning of the buffer in order to provide digitized voice data to the signal processor. The signal processing system will continue to use records from the buffer until it reaches the end, at which point it will start from the beginning again as long as the block at the beginning of the buffer contains new audio records. During the process of playing the speech buffer back, the application uses another of the functions provided to obtain the address of the oldest block of speech records that has already been played back. The application then uses this address to read the next set of records into the buffer from the recorded file. In a similar manner to recording, the usage of this function also provides an indication to the signal processing system that the previous block is now full of new data. It also returns the number of empty blocks. This number can be used by the application as an indication of whether it is providing data at a fast enough rate to keep up real-time requirements. If the buffer ever becomes empty, the application is given an interrupt, and the signal processing system will generate silence until the application has provided more speech records into the buffer.

BEST MODE FOR CARRYING OUT THE INVENTION

Figure 1:
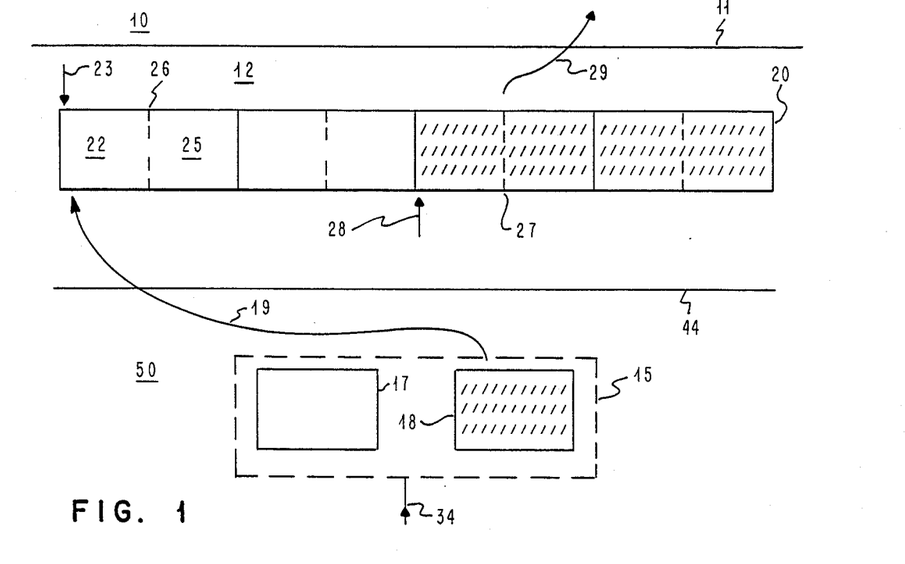
FIG. 1 is a functional block diagram of the voice buffer system of the present invention in a recording mode.

As seen in FIG. 1, digitized voice samples are input over line 34 to record buffer 15 in signal processing system 50. Record buffer 15 is a ping-pong type buffer comprising individual buffers 17 and 18. The digitized voice samples input over line 34 are directed to either buffer 17 or buffer 18, whichever one is empty at that time. As seen in FIG. 1, buffer 17 is empty while buffer 18 is filled. The digitized voice samples are a substantially endless stream which represent an essentially continuous intelligible speech message. The stream will continue as long as speech is being input to system 50. There is no predetermined limit as to the amount of speech data that can be entered into system 50.

As depicted by arrow 19, the digitized voice samples are then transmitted from record buffer 15 across hardware interface 44 into buffer 20 which resides in host system 12. Buffer 20 comprises eight records, with the first two records in buffer 20 being record 22 and record 25. Together records 22 and 25 comprise block 26. In general, signal processing system 50 allows application 10 to specify how many records are in buffer 20 and how many records are in a block. In the preferred embodiment disclosed herein, two records form one block in buffer 20. Pointer 23 is used to direct the transfer of digitized voice in accordance with arrow 19 from record buffer 15 to the next available record in buffer 20. In this example, pointer 23 indicates that record 22 of block 26 is the next available record to which data is to be input. Buffer 20 is a ring-type buffer which is filled from left to right across the page. Record buffer 15 transfers one record at a time to buffer 20. Consequently, it takes two record transfers to fill one block, such as block 26, in buffer 20.

As shown in FIG. 1, block 27 is filled with digitized voice data. Arrow 29 depicts the transfer of information from block 27 across application programming interface 11. All transfers across application programming interface 11 are done on a block by block basis. Pointer 28 is used to indicate the start of the block which will be transferred next across interface 11. The transfer of information across programming interface 11 is under the control of software application 10 (see FIG. 5) running on host 12 using programming interface 11. The interaction among application 10, application programming interface 11, host 12, and signal processing system 50 will be explained in more detail hereinafter with respect to FIGS. 5–7.

Figure 2:
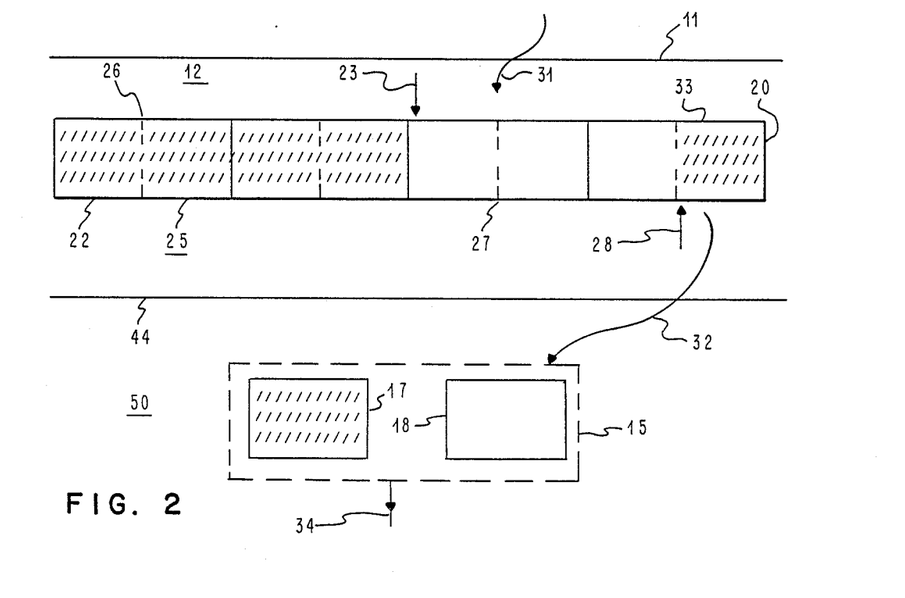
FIG. 2 is a functional block diagram of the voice buffer system of the present invention in a playback mode.

The reverse process, i.e., audio playback is shown in FIG. 2. In this case, a block of data is transferred across interface 11 in accordance with arrow 31. Once again, all transfers across interface 11 proceed on a block by block basis. Pointer 23 indicates the next block in buffer 20 to which information is input from across interface 11. In this case, information is input to block 27. Pointer 28, in turn, points to the next record which will be transferred from buffer 20 in host 12 across hardware interface 44 to record buffer 15. Such a transfer is indicated by arrow 32. In this case, record 33 is transferred to buffer 18 in record buffer 15 since buffer 17 is already filled. The voice information is then output over line 34.

Figure 3:
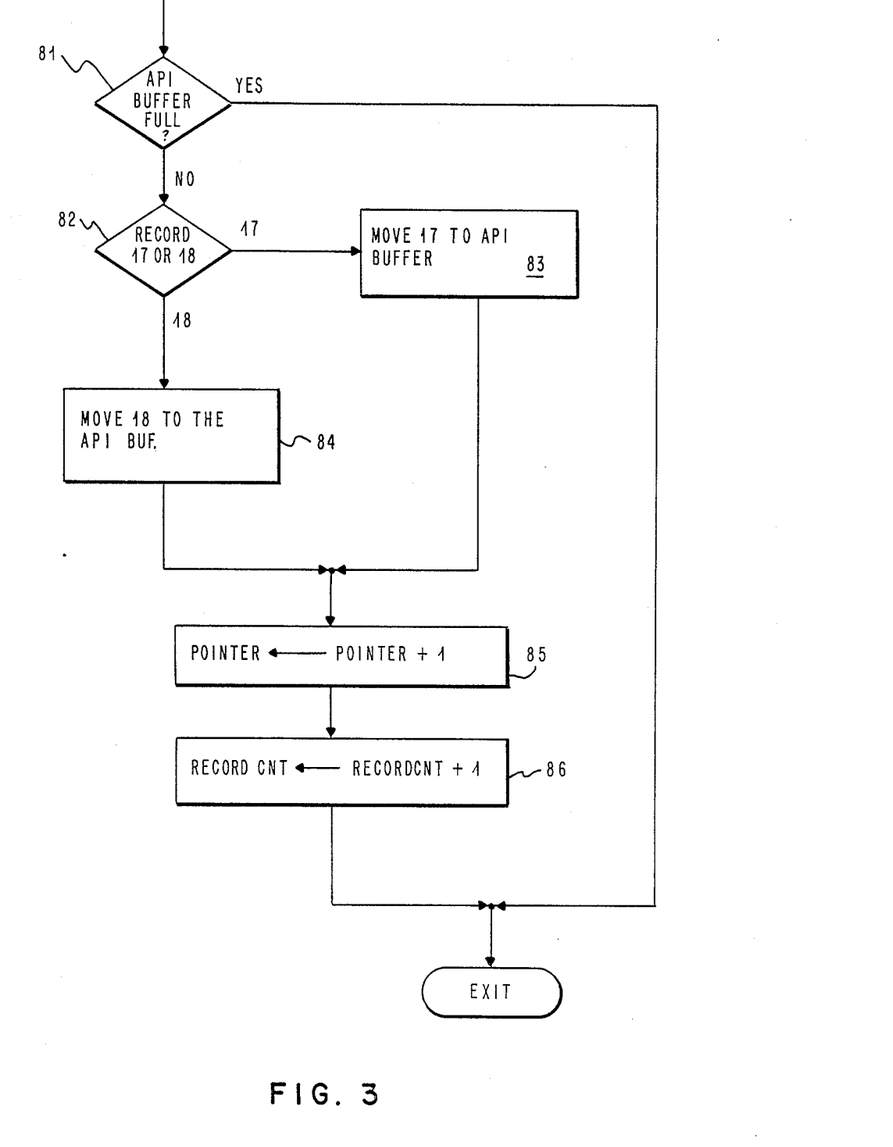
FIG. 3 is a flow chart depicting the transfer of information from the signal processing system to the host system.

The transfer of information from record buffer 15 to buffer 20 is described in the flow chart of FIG. 3. For purposes of FIG. 3, buffer 20 is referred to as the application program interface (API) buffer, i.e., the two terms are interchangeable. It is to be emphasized that the API buffer or buffer 20 resides in host 12. In decision block 81, a determination is made as to whether or not the API buffer is full. If buffer 20 is full, then no data will be transferred across hardware interface 44 from record buffer 15. However, if the API buffer is not full, i.e., there is at least one record empty, then the contents of either buffer 17 or buffer 18 is transferred to the API buffer. The transfer of the information in either buffer 17 or 18 is depicted in steps 82, 83, and 84. After there has been a transfer in accordance with arrow 19, pointer 23 is incremented by one record in accordance with step 85. In this case, pointer 23 would be incremented to indicate that record 22 is now filled and record 25 is the next record to be filled. Finally, as shown in step 86, the count of the number of records in the API buffer 20 which are filled is incremented by 1. The reason for incrementing, or even for keeping a record count will be explained more clearly in relation with FIG. 4.

Figure 4:
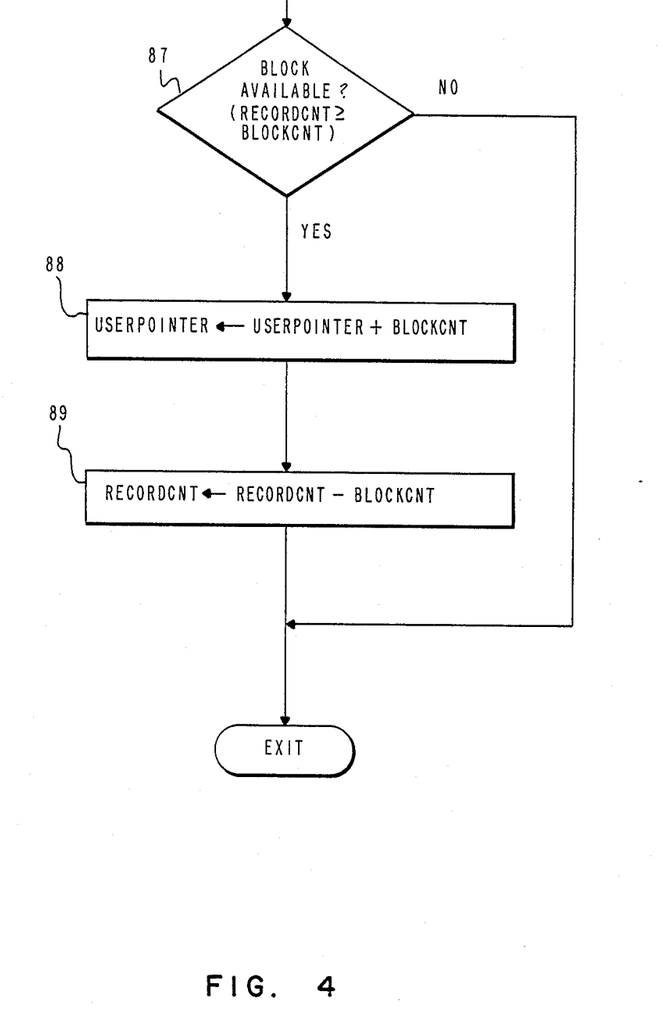
FIG. 4 is a flow chart depicting the transfer of information from the host system to a file under control of a software application.

The transfer of information from API buffer 20 across interface 11 is depicted in the flow chart of FIG. 4. In step 87, a determination is made as to whether or not there is a filled block available in buffer 20 for transfer across interface 11. This determination is made by first determining whether or not the record count being kept is greater than or equal to the block count where the block count is equal to the number of records per block. In the preferred embodiment disclosed herein, the number of records per block is equal to 2. Consequently, a block transfer out of buffer 20 across interface 11 will only occur when the record count is at least 2, thereby indicating one block of buffer 20 is full. As shown in FIG. 4, if the record count is not greater than or equal to the block count, then there is no transfer across interface 11. However, if the record count does equal or exceed the block count, then a transfer is made and as indicated in step 88, pointer 28 is incremented by 2 (which is the block count, i.e., two records per block) thereby indicating the next block which is to be transferred out of buffer 20 across interface 11. In this case, pointer 28 would point to the block immediately to the right of block 27. Additionally, as shown in step 89, the record count is decremented by the block count or 2. This is so, because two records are transferred with each block transfer out of buffer 20 across interface 11. For example, if four records and therefore, two blocks were filled in buffer 20 before the transfer, then only two records would remain filled in buffer 20 before another transfer from record buffer 15.

Figure 5:
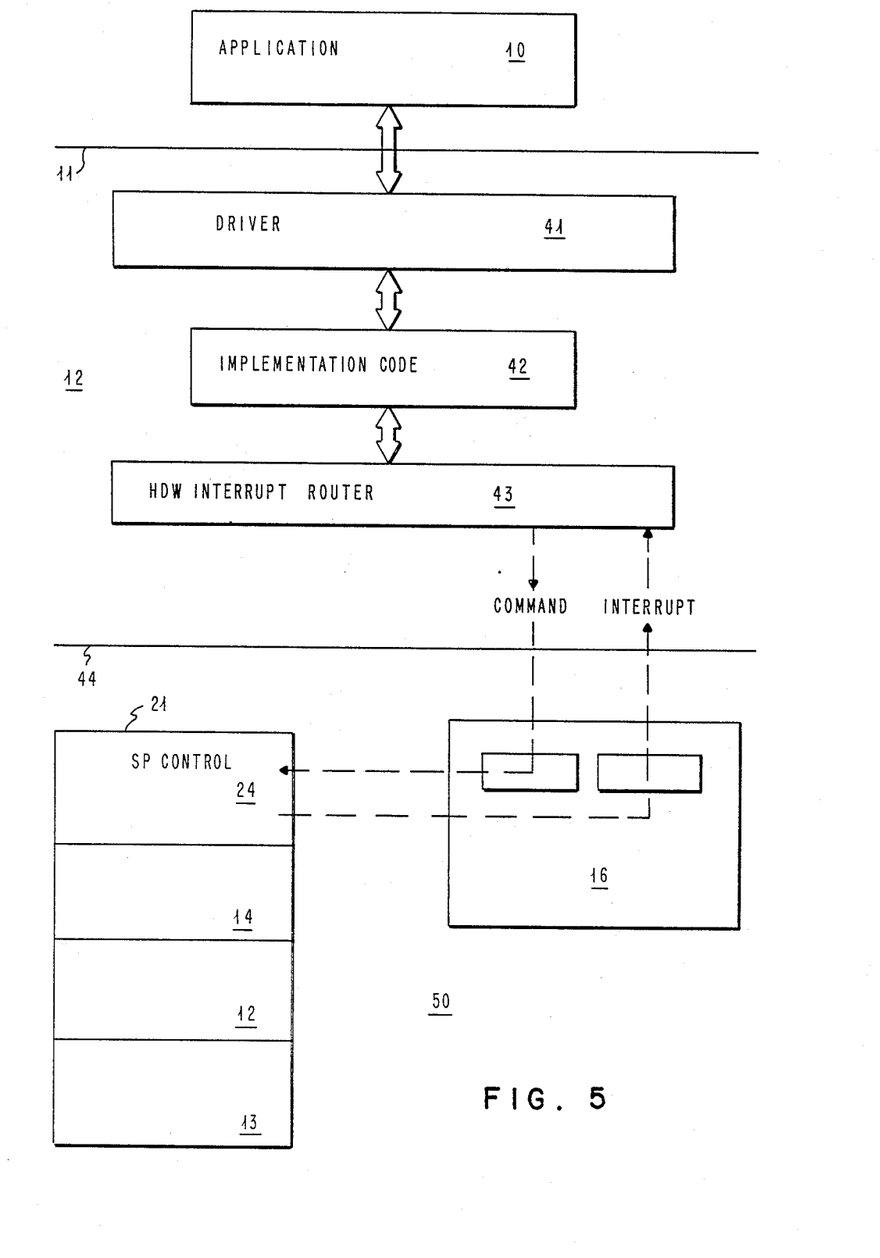
FIG. 5 is a simplified functional block diagram of the overall system of the present invention.

FIG. 5 shows in simplified functional block form the flow of commands and interrupts to and from application 10 and to and from signal processing system 50. Application 10 interacts across the programming interface 11 with driver 41, implementation code 42 and hardware interrupt router 43, each of which is located in host system 12. Hardware interface 44 forms the boundary between host processing system 12 and signal processing system 50. Application commands terminate in partition 24 of instruction memory 21, while interrupts originate in partition 24. Partition 24 contains the signal processor control program. This control program manages instruction memory 21 in partitions 12, 13, and 14, and allows the signal processing code in partition 12, 13, 14 to run concurrently, thereby sharing the resources of the signal processing system 50. The flow of commands and interrupts which define programming interface 11 will now be explained in more detail with reference to FIGS. 6 and 7.

Figure 6:
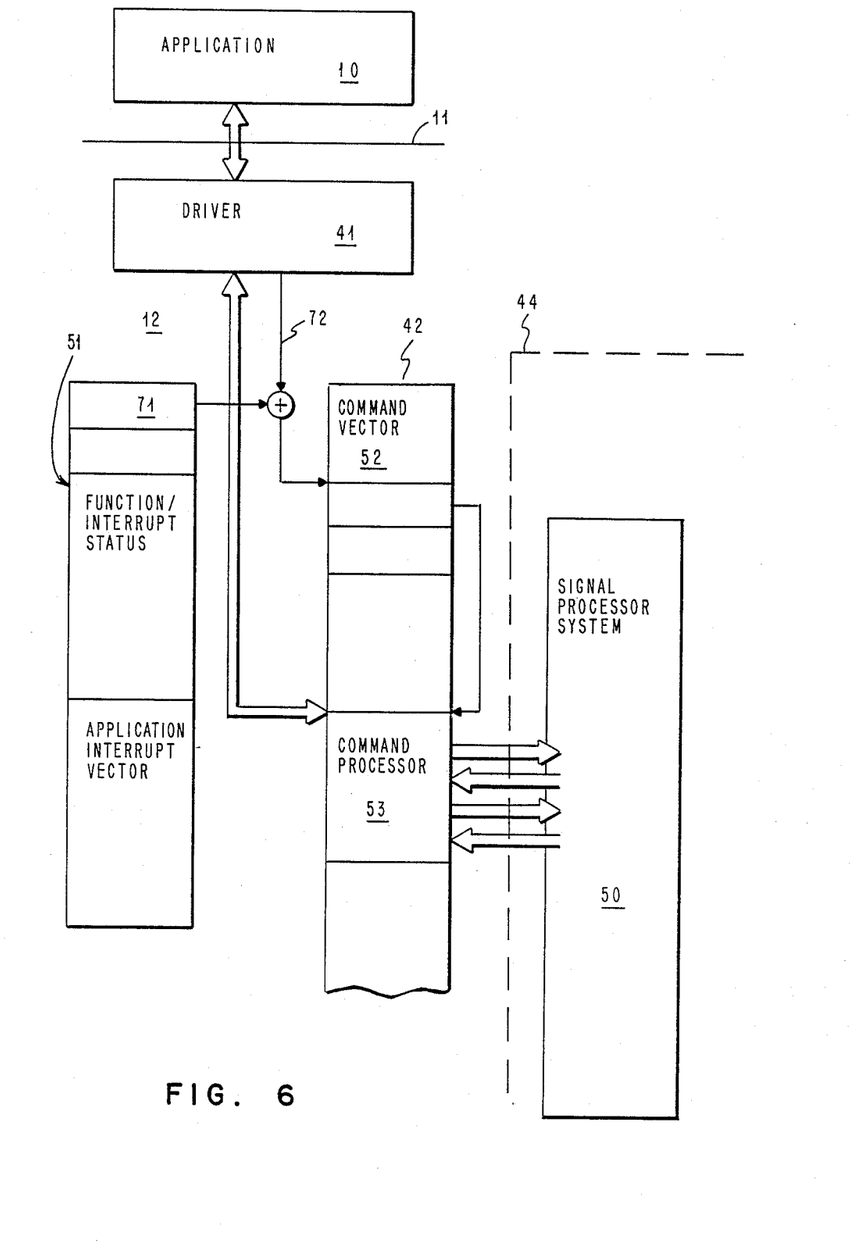
FIG. 6 is a simplified block diagram demonstrating the flow of commands from an application program across the programming interface through the host processing system to the signal processing system.

FIG. 6 details the flow of commands from application 10 across interface 11 through host 12 and to signal processing system 50. The commands which are input from application 10 to interface 11 contain two types of identification. The first type of identification provided is the function set that is to be used and this identification selects the appropriate control block 51 which in turn accesses the implementation code 42. The second type of identification is of the particular command within a given function set. Driver 41 takes these commands and then passes them on to the appropriate locations in implementation code 42. The select control block information which is part of the command input to interface 11 and driver 41 identifies a particular control block 51. This control block 51 contains a pointer block 71 which points to the beginning of command vector block 52. The command code information contained in the command is output over line 72. Together with the pointer information from pointer block 71, the command code points or indexes to the particular location in command vector 52 to which this command is pertinent. After execution, command vector 52 points to a specific piece of implementation code in command processor 53. Having found the particular piece of code required, driver 51 then passes control to this command processor 53 which contains the required code. In effect, command vector 52 along with the command code issued over line 72 and pointer block 71 perform an addressing function. Command processor 53 then implements the particular command which has been output from application 10 to signal processing system 50.

Figure 7:
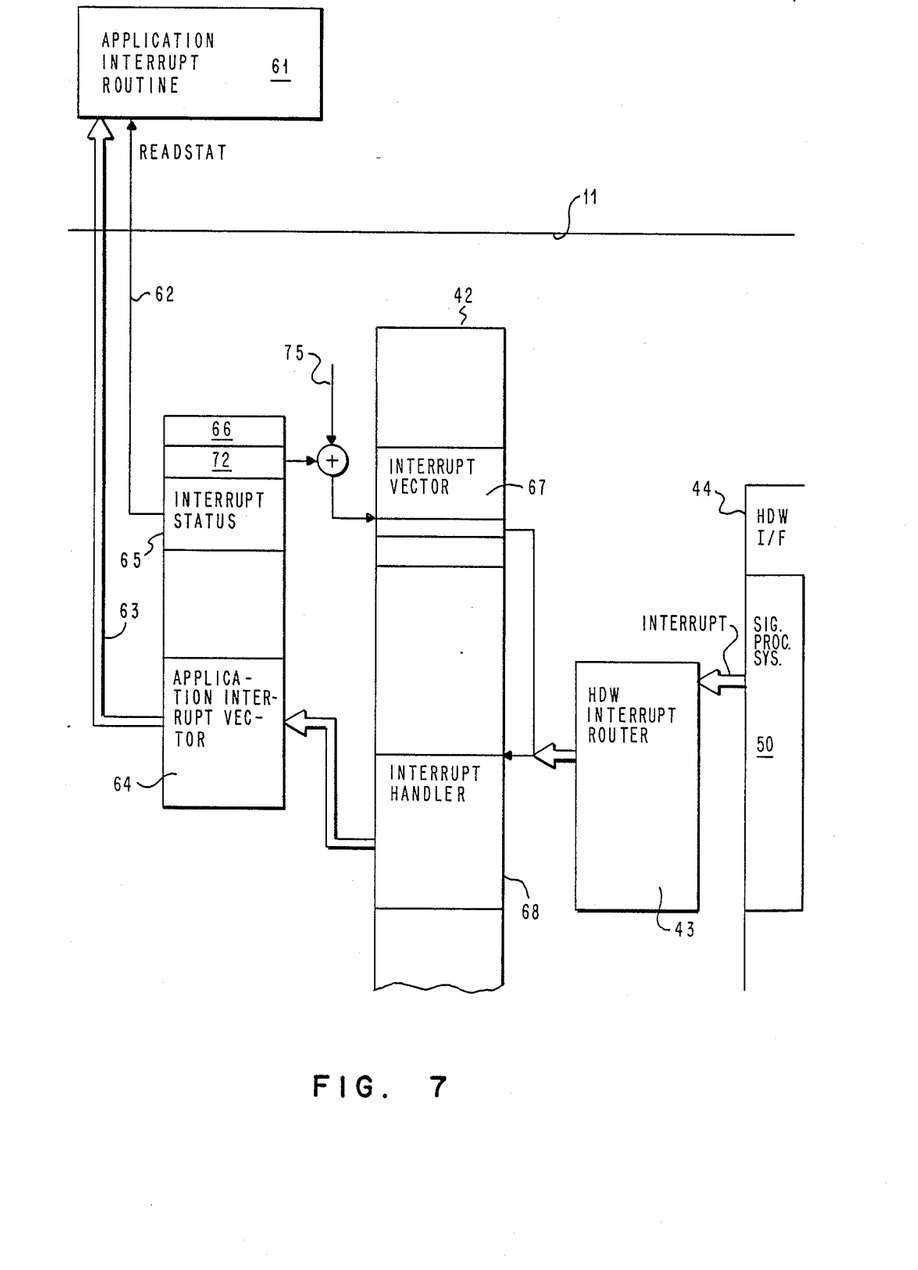
FIG. 7 is a simplified block diagram demonstrating the flow of interrupts from the signal processing system and through the host processing system back to the application program.

FIG. 7 provides in more detail the flow of interrupts from signal processing system 50 back through host 12 to interface 11 and then to application interrupt routine 61 within application 10. An interrupt is generated by signal processing system 50 and output across hardware interface 44 to hardware interrupt router 43 over line 73. The interrupt contains both partition information and information as to the type of interrupt. The partition information is used to identify control block 66, which contains pointer 72 which points to the starting point of interrupt vector 67. The type of interrupt is input over line 75. Together with pointer 72, the correct point in interrupt vector block 67 is accessed. After execution, interrupt vector 67 points to the entry point in interrupt handler 68. Hardware interrupt router 43 then routes the interrupt to the interrupt handler 68. Interrupt handler 68 then executes and passes the interrupt up to application interrupt routine 61 through application interrupt vector 64. The information provided on line 63 to application interrupt routine 61 contains information as to which interrupt is coming and gives application 10 control to process the interrupt. After control has been given to application 10, a read status command is output from application 10. The read status information is then input over line 62 from interrupt status block 65 to application interrupt routine 61. This signal provides more information regarding the interrupt which has just been sent and informs application interrupt routine 61 of all interrupts that have taken place since the previous read status command. The interrupt status block 65 is updated by interrupt handler 68 each time interrupt handler 68 is accessed by hardware interrupt router 43.

A function set, such as the record or playback function sets, comprises two software files. One file is for the host processing system 12, while the other file is for the signal processing system 50. When a function set is activated, both files are loaded into the memory (not shown) of host 12 and then the signal processing code is downloaded into instruction memory 21. This downloading is basically a memory to memory move performed by base partition 14. This downloading may be performed while one of the other partitions, either 12 or 13 is executing.

In operation, when it is desired to transfer digitized voice into buffer 20, application 10 supplies a BUFFINIT command which specifies a buffer within host 12 to which speech data is to be transferred. The purpose of the BUFFINIT command is to introduce buffer 20 to the RECORD function set to enable the buffering of voice data in buffer 20. At this time, a new empty buffer is established. A START command is then generated by application 10 to initiate the input of speech data into buffer 20. If this is the first START command after BUFFINIT, then the RECORD function set assumes that buffer 20 is empty and starts to record the voice data into the beginning of the buffer, i.e., into record 22. The input of voice data into buffer 20 is halted with a STOP command. During the process of filling buffer 20, application 10 is using a LISTEN command to obtain the address of the oldest complete block of voice records that has not yet been processed, i.e., transferred across interface 11. The address is returned together with the number of complete blocks (blocks available from that point). Application 10 then uses this information to write the block wherever it is desired to store the voice information after it is transferred across interface 11. The next LISTEN command that is output by application 10 provides an indication to the RECORD function set that this block is now free to hold more voice data.

Application 10 can also use the number of complete blocks returned by LISTEN as an indication of whether it is keeping up with the production of voice data, i.e., the voice data is being buffered and not lost. If buffer 20 becomes full, and data is still being received from record buffer 15, then a SPEECH LOST interrupt condition is generated and the excess voice data records are discarded until the next LISTEN frees space in buffer 20. Such an event will cause a discontinuity in the recording. A second interrupt condition is the RECORD condition. The RECORD condition is generated at the beginning of each processed record. The final interrupt condition that exists is the SILENCE condition which is generated if a predetermined period of slience is exceeded while the recording operation is taking place. If this occurs, then a STOP command is issued and the recording ceases. The final command used with the RECORD function set is the DATAEND command which is used to drain any residual data from buffer 15 and to complete the last block being recorded into buffer 20 after the RECORD function set was stopped by the STOP command.

In the playback function as shown in FIG. 2, the BUFFINIT command is used to introduce buffer 20 to the PLAYBACK function set. This command is used to supply a buffer through which speech data is to be transferred across interface 11 into the chosen buffer in host 12. At the time the BUFFINIT command is issued, if there is a buffer currently established and operating in host 12, it is discarded along with any other voice data buffered below interface 11. The START command is then used to initiate the transfer of voice data across interface 11 into buffer 20 and then into record buffer 15 in signal processing system 50. The STOP command is used to stop the transfer of voice data from buffer 20 across hardware interface 44 to record buffer 15.

During the cyclic process of transferring voice data across interface 11 into buffer 20 and across interface 44 to record buffer 15, application 10 uses a SPEAK command to obtain the address of the oldest complete block of voice records that has already been played back. The address of this block is returned together with the number of empty blocks available from that point. Application 10 then uses this address to read the next set of records into buffer 20 and uses the next SPEAK to indicate to the playback function set that this block is now full of new records and can be played back. Application 10 may use the number of empty blocks returned by SPEAK as an indication of whether or not it is keeping up with the playback rate. If buffer 20 becomes empty and playback, i.e., transfer of speech data to record buffer 15 has not stopped, then a SPEECH LOSS interrupt condition is generated. This will cause a discontinuity in the playback. A RECORD PROCESS interrupt condition is generated at the beginning of each processed record. This interrupt serves to increment pointer 28. The START and STOP commands are used in the playback function set much the same as they are in the RECORD function set except that the voice data is flowing in the opposite direction.

While the invention has been particularly shown and described with reference to a preferred embodiment therein, it will be understood by those skilled in the art that various changes in form and detail may be made without departing from the spirit and scope of the invention.

What is claimed is:

1. A voice buffering system, comprising:
    means for receiving a substantially endless stream of digitized voice data representing an essentially continuous, intelligible speech message;
    means for storing the received substantially endless stream of digitized voice data at a first rate;
    means for controlling a transfer of the substantially endless stream of digitized voice data into and out of the storing means; and
    means, response to the controlling means, for outputting, in real time, the stored substantially endless stream of digitized voice data, wherein said essentially continuous, intelligible speech message remains intact at a second rate.

2. A voice buffering system according to claim 1 where said controlling means comprises a plurality of commands and interrupts operating under control of a software application.

3. A voice buffering system according to claim 2 wherein said receiving means comprises a first buffer having at least a second buffer and a third buffer therein for alternately receiving said substantially endless stream of digitized voice data and wherein said storing means comprises a fourth buffer having a plurality of records and a plurality of blocks with m records forming one block.

4. A voice buffering system according to claim 3 wherein said plurality of commands and interrupts comprises a first set for activating said fourth buffer and for starting and stopping the input of voice data into said fourth buffer, said first set enabling input of one record at a time into said fourth buffer.

5. A voice buffering system according to claim 3 wherein said plurality of commands and interrupts comprises a second set of commands and interrupts for transferring voice data out of said fourth buffer across a programming interface for use by said software application, said second set transferring one block of voice data at a time.

6. A voice buffering mechanism according to claim 4 further comprising a pointer for indicating the next record into which voice data is to be transferred into said fourth buffer.

7. A voice buffering system according to claim 5 further comprising a pointer for pointing to the next block of voice data to be transferred out of said fourth buffer across said programming interface.

* * * * *